(12) United States Patent
Hiraguchi (10) Patent No.: US 6,869,037 B2
(45) Date of Patent: Mar. 22, 2005

(54) RECORDING TAPE CARTRIDGE (75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/389,754

(22) Filed: Mar. 18, 2003

(65) Prior Publication Data

US 2003/0173440 A1 Sep. 18, 2003

(30) Foreign Application Priority Data

Mar. 18, 2002 (JP) ........................................ 2002-074921

(51) Int. Cl.[7] ............................................ G11B 23/107
(52) U.S. Cl. ........................ 242/348; 242/340; 360/96.3
(58) Field of Search ............................. 242/348, 348.2, 242/332.4, 532.1, 338, 338.1, 340, 342, 611, 611.1, 349, 352.3; 360/85, 95, 96.3, 132

(56) References Cited

U.S. PATENT DOCUMENTS

| | | | | |
|---|---|---|---|---|
| 3,857,531 A | * | 12/1974 | Jantzen | .................... 242/342 |
| 4,309,002 A | * | 1/1982 | Saitou et al. | ............... 242/340 |
| 4,723,731 A | * | 2/1988 | Posso | .................... 242/338.1 |
| 4,826,097 A | * | 5/1989 | Grant et al. | ................ 242/340 |
| 5,031,065 A | * | 7/1991 | Flor et al. | .................... 242/348 |
| 5,366,173 A | * | 11/1994 | Lammers et al. | ........ 242/338.1 |
| 6,113,020 A | * | 9/2000 | Nayak | ........................ 242/348 |
| 6,273,352 B1 | * | 8/2001 | Johnson et al. | ............ 242/340 |
| 6,491,247 B2 | * | 12/2002 | Huettenegger | .............. 242/342 |

* cited by examiner

*Primary Examiner*—William A. Rivera
(74) *Attorney, Agent, or Firm*—Sughrue Mion, PLLC (57) ABSTRACT

A recording tape cartridge in which feeding out and rewinding of a recording tape can preferably performed and a positioning of a reel in a height direction can be accurately performed. The recording tape cartridge having a case in which a single reel including a hub which has upper and lower flange portions and on which a recording tape is wound is accommodated, a gear for rotating the reel, which is provided at a central portion of a lower surface of the reel and meshed with a driving gear of a drive device at only planes substantially orthogonal to radial directions of the reel, and a reference portion, which is provided at the lower surface of the reel, for positioning the reel in an axial direction of the reel by abutting on a portion for positioning of the drive device, is provided.

17 Claims, 6 Drawing Sheets

RECORDING TAPE CARTRIDGE

BACKGROUND OF THE INVENTION

1. Field of the Invention

The present invention relates to a recording tape cartridge, particularly, a recording tape cartridge of which a single reel on which a recording tape such as a magnetic tape used as recording and playback medium for a computer or the like is wound is accommodated within a case.

2. Description of the Related Art

Conventionally, a magnetic tape cartridge, of which a single reel on which a magnetic tape used as data recording and playback medium for a computer or the like is wound is accommodated within a case, is known. A leader members such as a leader block, a leader pin and a leader tape are provided at a tip end of this magnetic tape. A drawing device, which is provided at a drive device, draws the leader members from the magnetic tape cartridge, and the magnetic tape fixed to the leader members is wound on a take up (a winding) reel of the drive device.

Recording of data onto the magnetic tape or playback of data recorded on the magnetic tape is carried out by synchronously rotating the reel of the magnetic tape cartridge and the winding reel of the drive device. The reel of the magnetic tape cartridge is structured such that a cylindrical hub and a lower flange which protrudes in a radial direction from a lower peripheral portion of the hub are integrally formed, and an upper flange which has the same configuration of the lower flange is bonded at an upper end of the hub. The magnetic tape is wound on a peripheral surface of the hub.

Figure 5A:
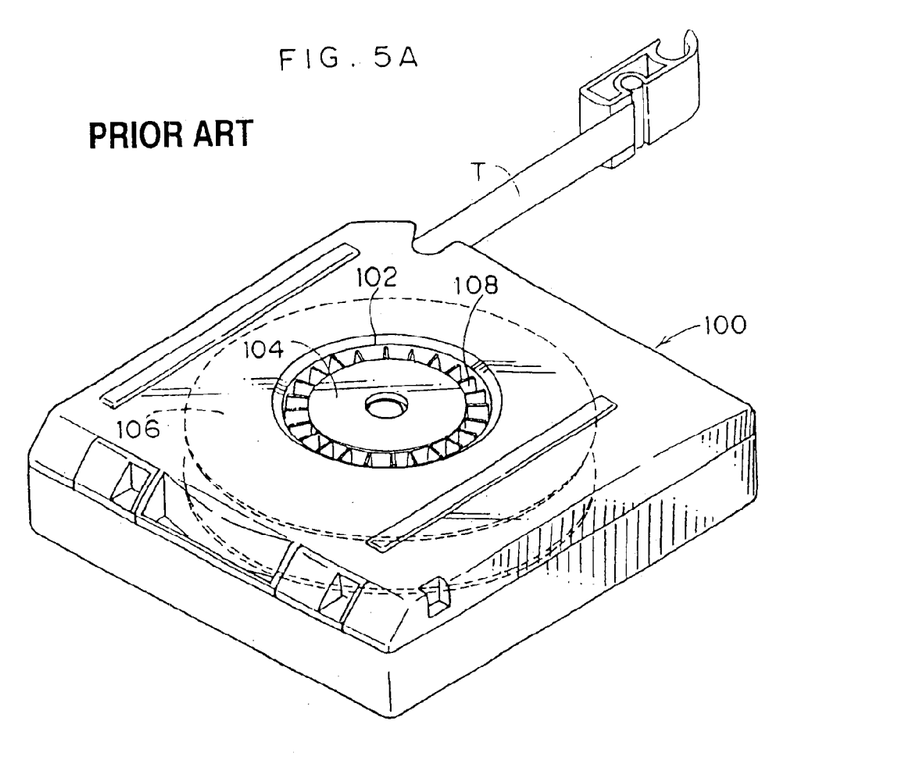
FIG. 5A is a schematic perspective view showing a conventional magnetic tape cartridge seen from oblique below.
Figure 5B:
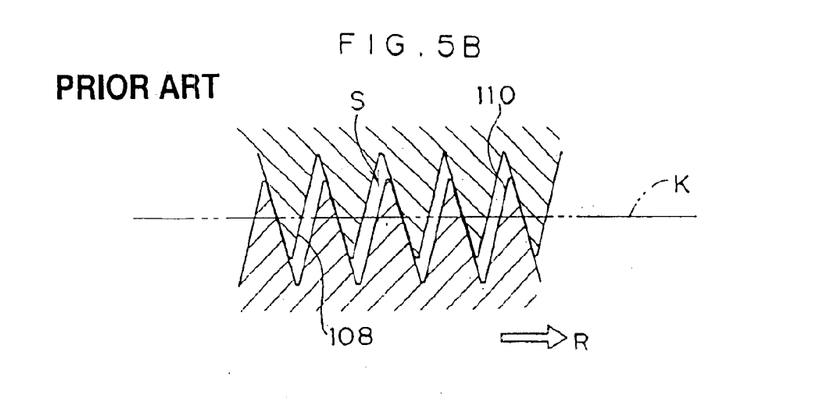
FIG. 5B is an explaining view showing a meshed portion of conventional reel gear and driving gear.

As shown in FIGS. 5A and 5B, a reel gear 108 having a ring configuration in a plane view is carved (provided) on a central portion of a lower surface of a reel 104 (a lower flange portion 106) which appears from an opening hole 102 drilled (provided) on a lower surface of a case 100. The reel 104 is driven to rotate by mashing a driving gear 110 provided at a rotating shaft of the drive device with the reel gear 108. That is, rotation power is transmitted to rotate the reel 104 by the reel gear 108 having a substantially saw tooth configuration and the driving gear 110 having a substantially saw tooth configuration being meshed each other.

However, when the reel 104 is rotated in a direction indicated by an arrow R in FIG. 5B by meshing the reel gear 108 having substantially saw tooth configuration and the driving gear 110 having substantially saw tooth configuration being meshed each other, there may be a case in which the driving gear 110 pushes the reel gear 108 upwardly thereby a small displacement (clearance) S is generated in a meshed portion between the reel gear 108 and the driving gear 110. When such displacement (clearance) S is generated, so-called "swelling" by which the lower flange 106 swings (moves) upwardly and downwardly is generated. This "swelling" may affect unpreferable influence on feeding out and rewinding of a magnetic tape T. Further, because a substantially central position in a height direction in a side view (a position indicated by an imaginary line (a two dotted line) K in FIG. 5B) at this meshed portion is set as a reference portion (a reference surface) in the height direction of the reel 104 with respect to the drive device, there is a problem in which a position of the reference portion (the reference surface) becomes unstable and therefore accurate positioning becomes difficult in a case in which displacement (clearance) S is generated in meshing between the reel gear 108 and the driving gear 110.

SUMMARY OF THE INVENTION

In view of the aforementioned, an object of the present invention is to provide a recording tape cartridge in which feeding out and rewinding of a recording tape can preferably performed and a positioning of a reel in a height direction can be accurately performed.

A first aspect of the invention is a recording tape cartridge comprising a case in which a single reel is accommodated, the reel including a hub which has an upper flange portion and a lower flange portion at an upper end portion and a lower end portion thereof respectively and on which a recording tape is wound, a gear for rotating the reel, which is provided at a central portion of a lower surface of the reel and meshed with a driving gear of a drive device at only planes substantially orthogonal to radial directions of the reel; and a reference portion, which is provided at the lower surface of the reel, for positioning the reel in an axial direction of the reel by abutting on a portion for positioning of the drive device.

In a second aspect of the invention according to the first aspect, the reference portion comprises a plurality of convex portions protruding from the lower surface of the reel.

In a third aspect of the invention according to the second aspect, the plurality of convex portions are provided at the lower surface of the reel at the outside of the gear for rotating the reel.

In a fourth aspect of the invention according to the first aspect, the portion for positioning, which abuts on the reference portion, is provided at a tip surface of a rotating shaft for rotating the driving gear.

In a fifth aspect of the invention according to the fourth aspect, a metal plate is provided at the lower surface of the reel at the outside of the gear for rotating the reel, and an electromagnet is provided at the tip surface of the rotating shaft at a position corresponding to the metal plate.

In a sixth aspect of the invention according to the first aspect, the reference portion has a ring shaped configuration having a predetermined height.

In a seventh aspect of the invention according to the sixth aspect, the reference portion is provided at the lower surface of the reel at the outside of the gear for rotating the reel.

In an eighth aspect of the invention according to the sixth aspect, the portion for positioning, which abuts on the reference portion, is provided at a tip surface of a rotating shaft for rotating the driving gear.

In a ninth aspect of the invention according to the eighth aspect, a plate made of metal is provided at the lower surface of the reel at the outside of the gear for rotating the reel, and an electromagnet is provided at the tip surface of the rotating shaft at a position corresponding to the plate made of metal.

In a tenth aspect of the invention according to the first aspect, the gear for rotating the reel is meshed with the driving gear of the drive device at only planes orthogonal to radial directions of the reel.

In an eleventh aspect of the invention according to the first aspect, the gear for rotating the reel has a plurality of bar shaped protrusion portions, and an inner side width, in a circumferential direction of the gear for rotating the reel, of each bar shaped protrusion portion is narrower than an outer side width thereof in a circumferential direction of the gear for rotating the reel.

In a twelfth aspect of the invention according to the first aspect, the gear for rotating the reel has a plurality of bar shaped protrusion portions, and a tip end of each bar shaped protrusion portion has a substantially sawtooth configuration in cross sectional view.

A thirteenth aspect of the invention is a recording tape cartridge comprising, a case in which a single reel is accommodated, the reel including a hub which has an upper flange portion and a lower flange portion at an upper portion and a lower portion thereof respectively and on which a recording tape is wound; and a gear for rotating the reel, which is provided at a central portion of a lower surface of the reel and meshed with a driving gear of a drive device at only planes substantially orthogonal to radial directions of the reel.

A fourteenth aspect of the invention is a recording tape cartridge comprising, a case in which a single reel is accommodated, the reel including a hub which has an upper flange portion and a lower flange portion at an upper portion and a lower portion thereof respectively and on which a recording tape is wound, and a reference portion, which is provided at the lower surface of the reel, for positioning the reel in an axial direction of the reel by abutting on a portion for positioning of the drive device.

As described above, in a case in which the reel gear for rotating reel is meshed with the driving gear of the drive device at only the planes which are substantially orthogonal to the radial directions of the reel (including planes which are orthogonal to the radial directions of the reel), the reel gear is meshed with the driving gear strongly and certainly. Accordingly, it does not occur that meshing between the reel gear and the driving gear is displaced due to rotation thereby clearance is generated. Therefore, "swelling" is not generated at the flange portion, and feeding out and rewinding of the recording tape can preferably performed. Further, because the reference portion for positioning in the height direction of the reel is provided at a portion other than the reel gear for rotating reel, the positioning can be carried out with accuracy.

DESCRIPTION OF THE PREFERRED EMBODIMENT

An embodiment of the present invention will be given hereinafter in detail on the basis of an example shown in drawings. Note that, for convenience of explanation, a direction of loading a recording tape cartridge into a drive device (a direction of an arrow P shown in FIG. 1) is called a front direction; and a rear, left, right, top, and bottom directions are expressed on the basis of the front direction. Further, a magnetic tape is adopted as a recording tape, and a magnetic tape cartridge will be explained hereinafter.

Figure 1:
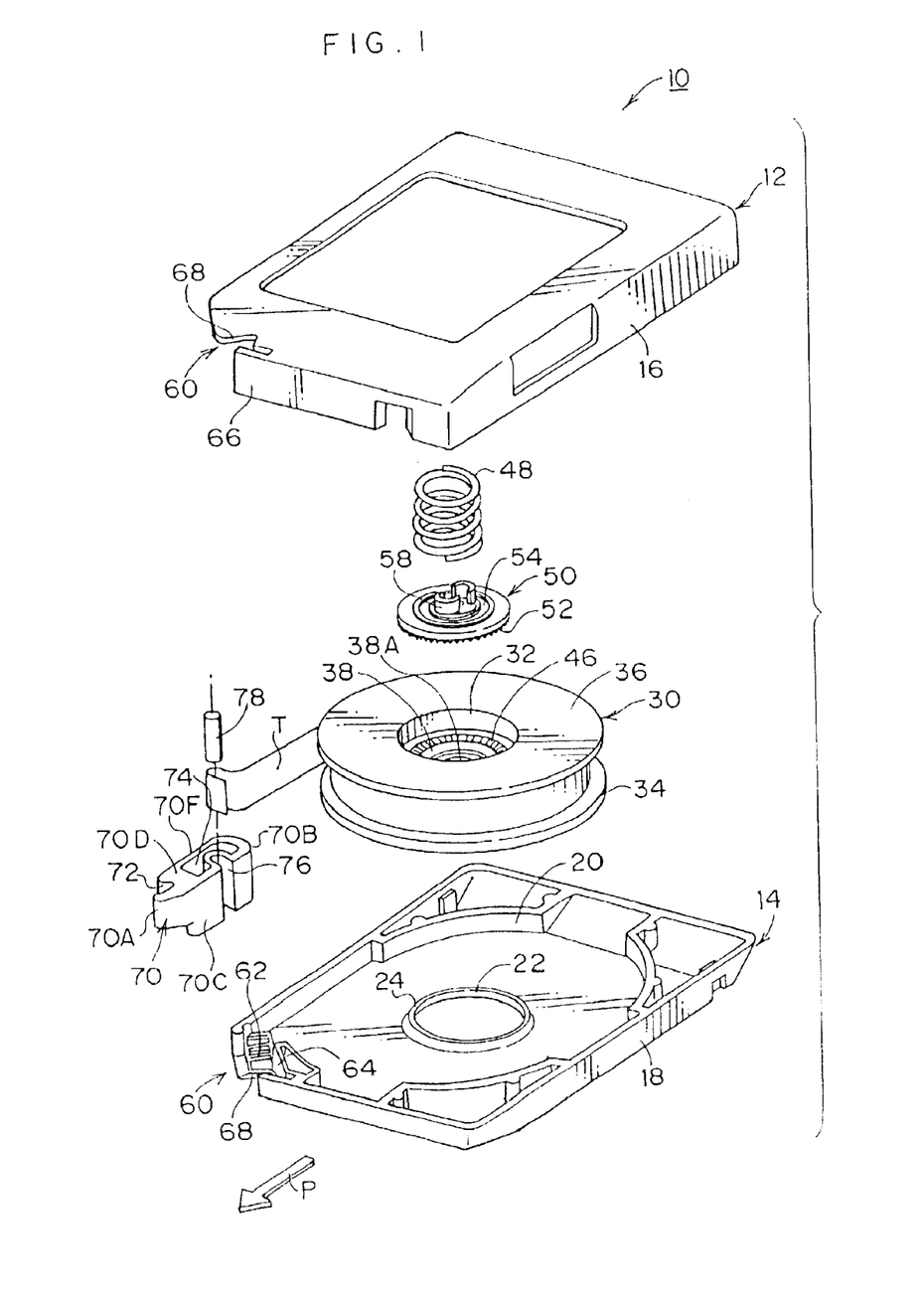
FIG. 1 is an exploded schematic perspective view showing a magnetic tape cartridge relating to the present invention seen from oblique above.

As shown in FIG. 1, a magnetic tape cartridge 10 is formed in a substantially rectangular box shape and is structured by an upper case 12 and a lower case 14 each formed of a synthetic resin. A peripheral wall 16 of the upper case 12 and a peripheral wall 18 of the lower case 14 are welded together by ultrasonic welding or the like. A single reel 30 on which a magnetic tape T as information recording and regenerating medium is wound is rotatably accommodated at an inner side of the magnetic tape cartridge 10. That is, substantially arc-shaped walls 20 for preventing reel from moving freely are provided to stand erect at respective inner surfaces of the upper case 12 and the lower case 14, and the reel 30 is accommodated at inner sides of the walls 20 for preventing reel from moving freely.

An opening hole 22 having a circular configuration is provided (drilled) at a central portion of the lower case 14. A reel gear 40, a reel plate 41 and a convex portion 42 (see FIGS. 2, 3 and 4) and the like provided at a lower surface of the reel 30 appear from the opening hole 22. The reel 30 is structured by a cylindrical reel hub 32, an upper flange portion 36 and an lower flange portion 34. The lower flange portion 34 protrudes in a radial direction from a lower peripheral portion of the reel hub 32. The lower flange portion 34 and the reel hub 32 are integrally formed by a synthetic resin. The upper flange portion 36 which has the same configuration of the lower flange portion 34 is bonded at an upper end of the reel hub 32 by ultrasonic welding or the like. The magnetic tape T is wound on a peripheral surface of the reel hub 32.

Figure 2:
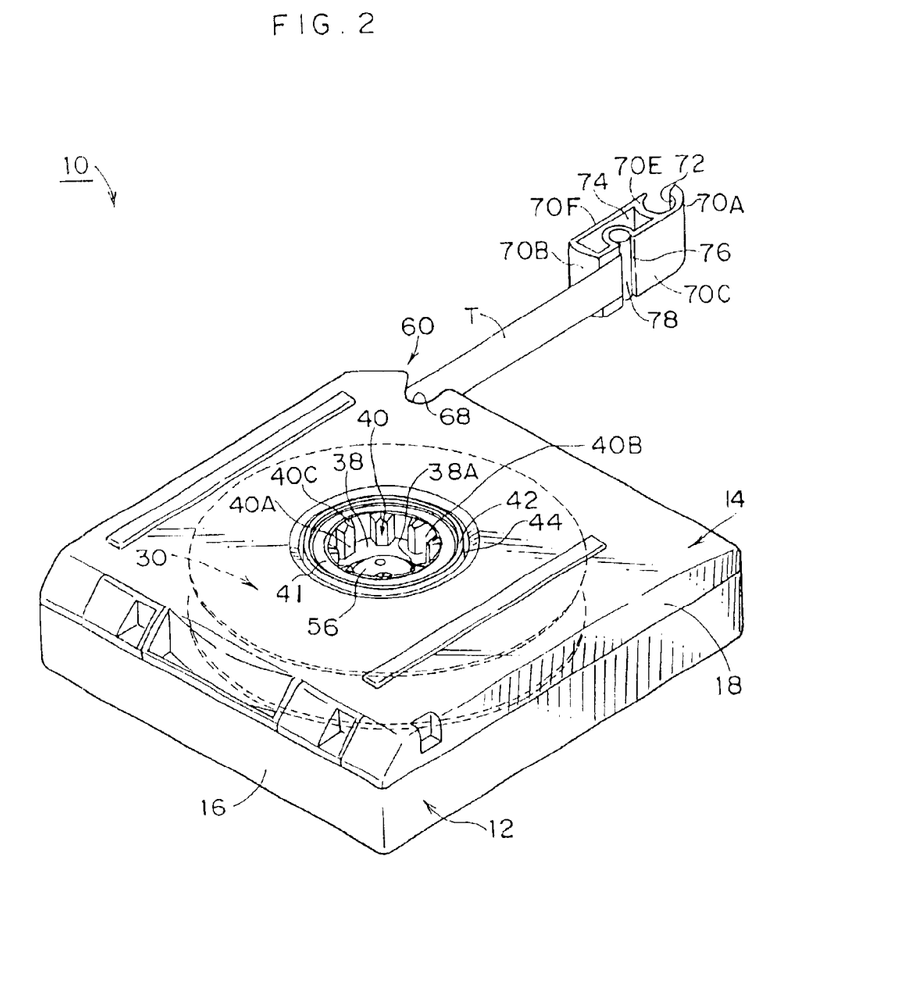
FIG. 2 is a schematic perspective view showing the magnetic tape cartridge relating to the present invention seen from oblique below.
Figure 3:
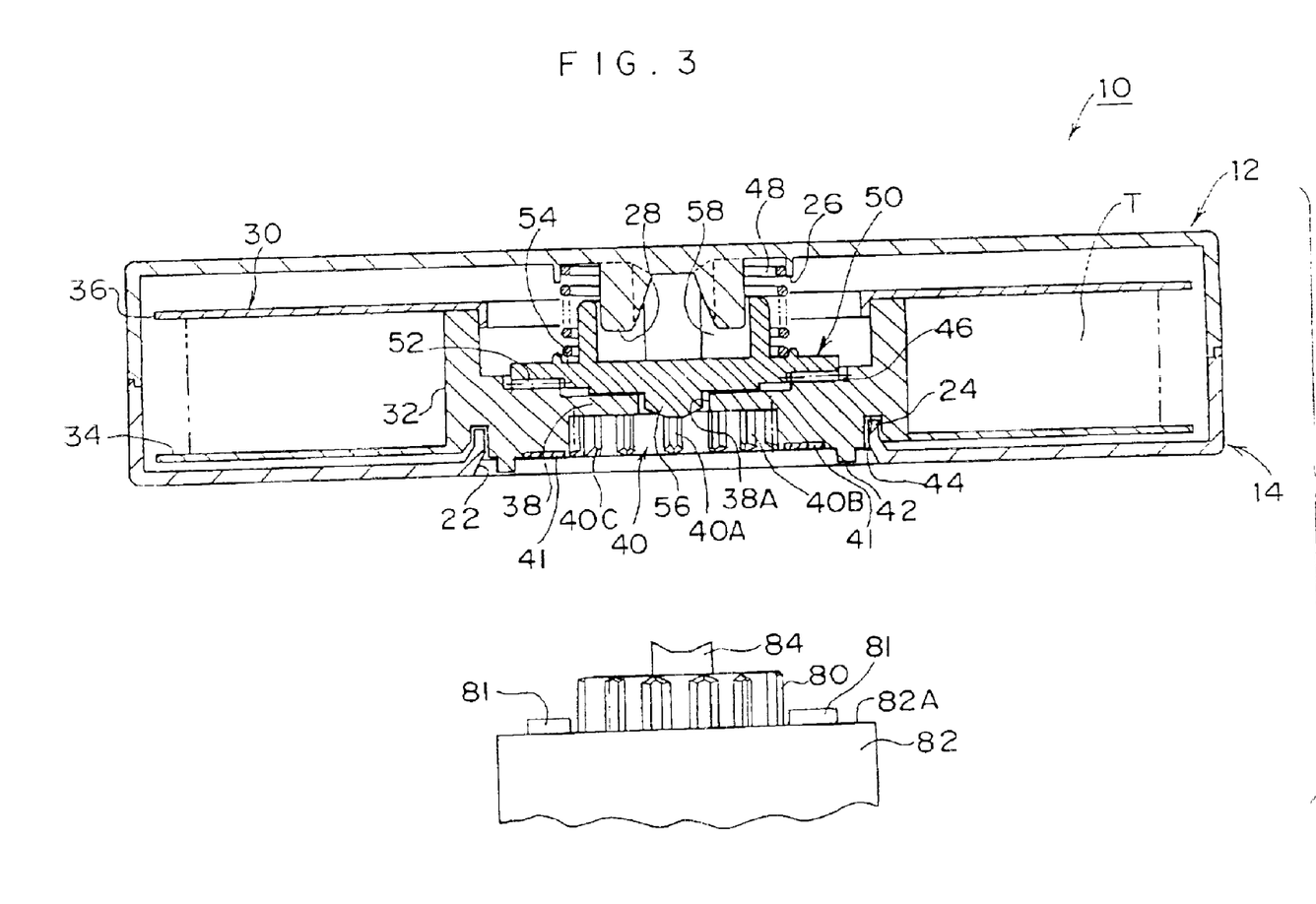
FIG. 3 is a schematic cross sectional side view showing a driving gear of a drive device and the magnetic tape cartridge relating to the present invention.
Figure 4:
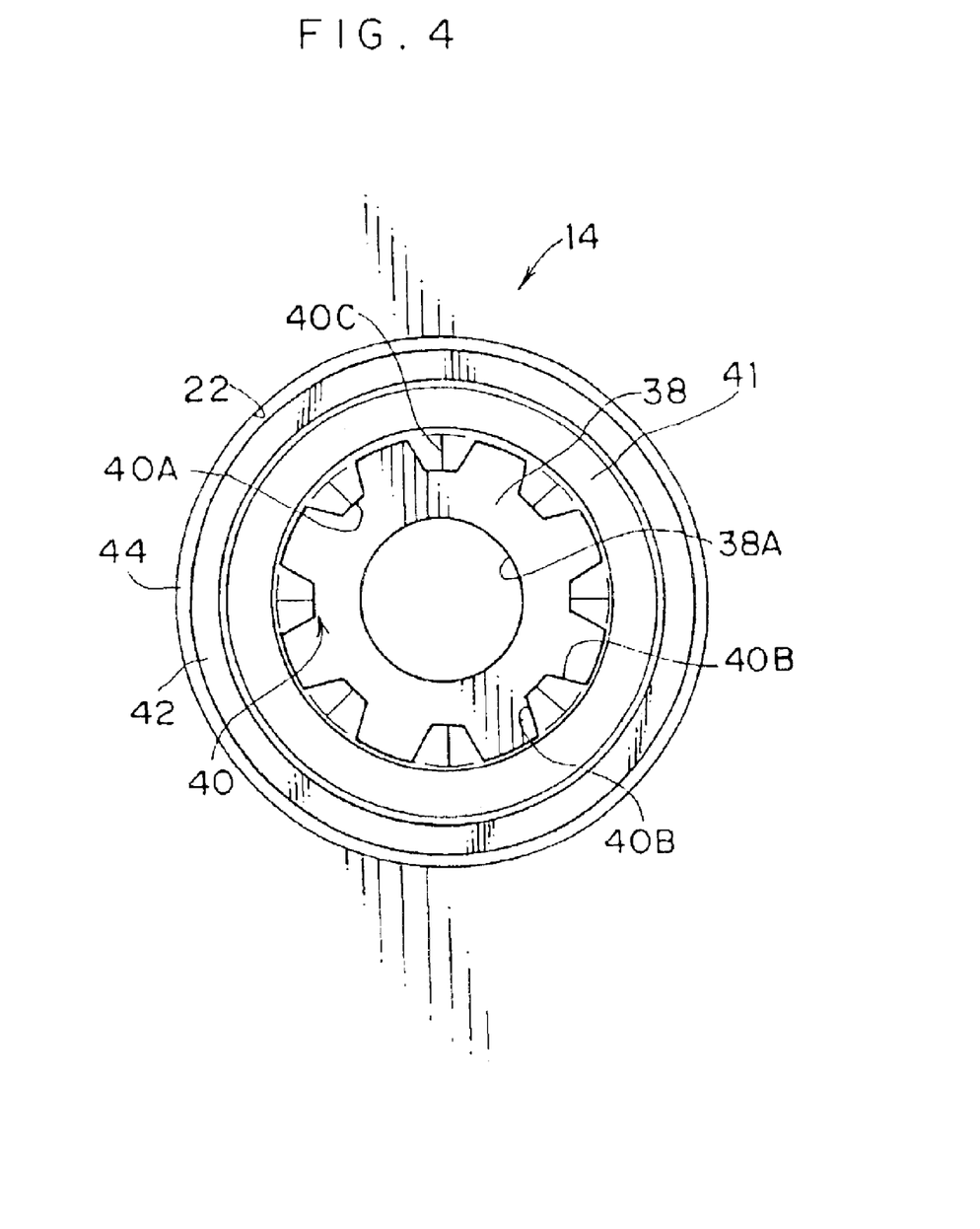
FIG. 4 is a schematic bottom view showing main portions of a reel of the present invention.

As shown in FIGS. 2, 3 and 4, a portion of the reel hub 32 at a side of the lower flange portion 34 is closed by a bottom wall 38 of which a through hole 38A is provided at a central portion. A reel gear 40 for driving to rotate the reel 30, is carved (provided) at a lower surface peripheral portion of the bottom wall 38. The reel gear 40 is formed in a ring shape. The reel gear 40 is structured to mesh with a driving gear 80 of the drive device at only planes which are substantially orthogonal to radial directions of the reel 30. For example, the reel gear 40 is structured such that a plurality of bar protrusion portions 40A (eight bar protrusion portions 40A in the drawings) having a predetermined length in a height direction of the reel hub 32 are arranged in a ring manner by predetermined intervals, that is, in a spline manner.

Taper surfaces 40B for guiding are formed at a left end and a right end of each bar protrusion portion 40A of the reel gear 40 such that a width of an outer side of the bar protrusion 40A is wider than that of an inner side of the bar protrusion portion 40A in a plane view. Each bar protrusion portion 40A has an equal leg trapezoid configuration in a plane view. Note that, in order to facilitate being pulled from a metal mold, there is a case in which an extremely small draft angle (an inclined surface) may be provided in the taper surface 40B so as to substantially diverge from a lower end side toward an upper end side thereof (so as to be formed in fan shape). It is described above that the reel gear 40 is structured to mesh with a driving gear 80 of the drive device at only planes which are substantially orthogonal to radial directions of the reel 30. That is, a plane substantially orthogonal to the radial direction includes both a plane orthogonal to the radial direction and a plane which is slightly inclined with respect to the plane orthogonal to the radial direction. However, it is preferable that the taper planes 40B are formed to be orthogonal to the radial directions of the reel 30.

Further, taper surfaces 40C for guiding are formed at a lower end portion of the bar protrusion portion 40A. The taper surface 40C is formed to incline from an outer side toward an inner and top side, and a central portion of the taper surfaces 40C are formed to protrude downwardly with obtuse angle so as to have a sawtooth configuration in a cross sectional view. Therefore, when the reel gear 40 is meshed with the driving gear 80, meshing the reel gear 40 and the driving gear 80 can be smoothly carried out. Note that it is preferable that the driving gear 80 has taper surfaces which are as the same as those of the taper surfaces because the reel gear 40 can be further smoothly meshed with the driving gear 80. Alternatively, it is possible to form the reel gear 40 (the bar protrusion portion 40A) without providing the taper surfaces 40B and 40C thereon.

Further, a ring shaped reel plate 41 made of metal is attached integrally to the lower surface of the reel hub 32 at an outer side with respect to the reel gear 40, by insert molding or the like. Further, a convex portion 42 is provided at the lower surface of the reel hub 32 at an outer side with respect to the reel plate 41. The convex portion 42 has a planar lower surface thereof as a reference portion (a reference surface) for positioning (determining a position), which defines a position in a height direction of the reel 30. The convex portion 42 protrudes downwardly so as to have a predetermined height from the lower surface of the reel hub 32, and has a ring configuration. A ring shaped groove 44 is provided at the lower surface of the reel hub 32 at an outer side with respect to the convex portion 42. A rib 24 provided to stand erect upwardly at a circumference portion of the opening hole 22 is fitted into the circular groove 44.

Accordingly, the reel gear 40, the reel plate 41 and the convex portion 42 appear from the opening hole 22. Therefore, the lower surface of the convex portion 42 abuts on an upper surface 82A of the rotating shaft 82 on which the driving gear 80 is provided when the driving gear 80 is meshed with the reel gear 40, thereby positioning in the height direction of the reel 30 is carried out with accuracy. Further, an electromagnet 81 having a ring configuration provided on the upper surface 82A of the rotating shaft 82 is attached (adhered) to the reel plate 41 due to magnetic force when the driving gear 80 is meshed with the reel gear 40, thereby, a rotation center of the driving gear 80 and a rotation center of the driving gear 40 are preferably secured (held).

Figure 6:
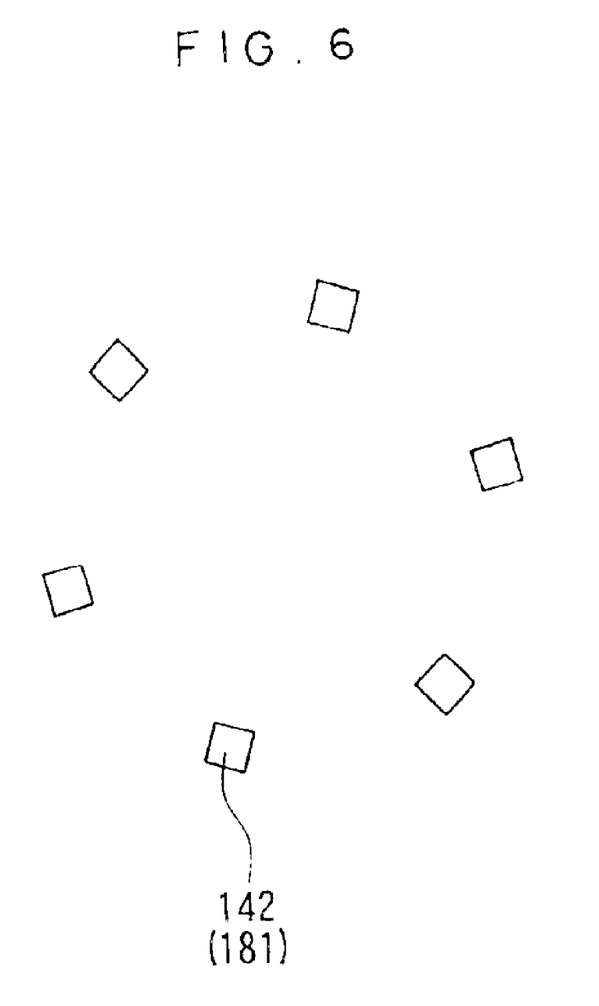
FIG. 6 is a plane view showing another example of a reference portion relating to the present invention.

Note that, in the embodiment described above, the convex portion 42 and the electromagnet 81 have a circular ring shape configuration, namely, have a continuous configuration. However, the present invention is not limited to the same. Convex portions and electromagnets may be provided intermittently, that is, overall configuration of convex portions and/or electromagnets may be a ring shape configuration with predetermined gaps in a circumference direction thereof. For example, a plurality of convex portions 142 as shown in FIG. 6 can be provided, or a plurality of electromagnets 181 as shown in FIG. 6 can be provided. Further, in the embodiment described above, a portion for positioning of the drive device is set to the upper surface 82A of the rotating shaft 82. However, the present invention is not limited to the same. The portion for positioning of the drive device may be provided at a portion other than the rotating shaft 82. In the similar way, the electromagnet 81 may be provided at a portion other than the rotating shaft 82.

On the other hand, a reel gear 46 for braking, having a ring configuration, is provided (carved) at an upper surface of the bottom wall 38 and at the inside of the reel hub 32. A braking gear 52, which is provided (carved) at a peripheral lower surface of a braking member 50 provided in (inserted into) the reel hub 32, is meshed with the reel gear 46. That is, the braking member 50 is urged downwardly by a coil spring 48, and therefore the reel 30 is urged downwardly. Accordingly, the reel gear 46 and the braking gear 52 are made to mesh each other such that the reel 30 is prevented from being shaky (unstable), that is, from rotating inadvertently, when not in use (when the recording tape cartridge is not loaded to the drive device).

The coil spring 48 is held between a ring shaped protrusion 26 provided in a protrusion manner at a central portion of an inner surface of the upper case 12 and a ring shaped groove 54 provided at an upper surface of the braking member 50. A substantially cylinder shaped protrusion 56, which is insertable into the through hole 38A, is provided at a central portion of an lower surface of the braking member 50. Cylinder shaped convex portions 58, each having a substantially U-shape configuration in a plane view, are provided to stand erect at inside the ring shaped groove 54 such that opening sides of respective cylinder shaped convex portions 58 face each other. Two engaging pins, provided adjacently each other at inside the ring shaped protrusion 26 in a protruding manner, are inserted into the cylinder shaped convex portions 58, respectively.

Further, an opening portion 60 is formed in a front right corner portion of the magnetic tape cartridge 10 such that portions of peripheral walls 16 and 18 at the front right corner side are cut. The opening portion 60 is provided to allow the magnetic tape T, which is wound on the reel 30, to be pulled out to the exterior. When the magnetic tape cartridge 10 is not in use, a leader block 70, to which a tip end portion of the magnetic tape T is attached, is anchored on the front right corner portion of the magnetic tape cartridge 10, and the opening portion 60 is closed by the leader block 70.

That is, at inside surfaces of the upper case 12 and the lower case 14 in the vicinity of the corner portion (the opening portion 60), a fitting wall 62 and an inner wall 64, corresponding to an exterior configuration of the leader block 70, are provided (protrude). Further, an upper surface of the upper case 12 at the front side is cut out in an elongated manner in a direction parallel to the peripheral wall 16 such that a plate spring shaped engaging wall 66 is formed. A tip end of the leader block 70 is engaged at a protrusion (not shown in the drawings) of a tip end of the engaging wall 66 by utilizing elastic deformation of the engaging wall 66, an upper surface portion 70D and a lower surface portion 70E of the leader block 70 are fitted at the fitting walls 62, respectively, and a left side surface portion 70C of the leader block 70C abuts on the inner walls 64, thereby the leader block 70 is engaged.

Further, at the upper case 12 and the lower case 14 in the vicinity of the opening portion 60, a concave portion 68, having the substantially same configuration, in a plane view, of a concave portion 72 formed at the tip end portion of the leader block 70, is formed at a position corresponding to the concave portion 72, and a pulling out pin (not shown in the drawings) of the drive device, which pulls out the leader block 70, can be easily inserted.

The leader block 70 has a substantially rectangular shaped block, and the left side surface portion 70C, the upper surface portion 70D, the lower surface portion 70E, described above, a front surface portion 70A, a rear surface portion 70B and a right side surface portion 70F are formed thereon. The front surface portion 70A is formed by bending to have a substantially circular arc configuration in a plane view. The rear surface portion 70B is formed to have a curved surface such that the rear surface portion 70B (the curved surface) becomes a part of a peripheral surface of a reel hub (not shown in the drawings) of a take up reel of the drive device when the leader block 70 is fitted to the reel hub of the take up reel. The concave portion 72, with which the pulling out pin of the drive device is engaged, is formed at the front surface portion 70A.

Further, a hole portion is formed at the upper surface portion 70D and the lower surface portion 70E. A concave portion 76 is formed at the left side surface portion 70C of the leader block 70 at a substantially central position in a longitudinal direction of the leader block 70. The concave portion 76 is provided in order that the tip end of the magnetic tape T is fixed to the concave portion 76. The tip end of the magnetic tape T is fixed to the leader block 70 by a clamp pin 78 having elasticity, made of synthetic resin, being fitted to the concave portion 76 so as to nip the tip end of the magnetic tape T.

Next, an operation of the magnetic tape cartridge 10 having the structure described above will be described. The reel 30 provided in the magnetic tape cartridge 10 is prevented from rotating inadvertently, when not in use, by the braking member 50. That is, the reel gear 46 provided in the reel hub 32 of the reel 30 and the braking gear 52 of the braking member 50, which is urged downwardly by the coil spring 48, mesh each other, thereby the reel 30 is prevented from rotating inadvertently. The opening 60 is closed by the leader block 70.

When the magnetic tape cartridge 10 is used, the magnetic tape cartridge 10 is loaded to a bucket (not shown in the drawing) in the drive device. When the magnetic tape cartridge 10 is loaded to the bucket, the bucket moves downwardly, and the rotating shaft 82 relatively approaches the opening hole 22. Then, a protrusion 84 having substantially cylinder configuration provided at a central portion of the upper surface of the rotation shaft 82 (the driving gear 80) approaches to enter from the through hole 38A of the bottom wall 38, and the protrusion 84 abuts on the protrusion 56 of the braking member 50. Then, the braking member 50 is pushed upwardly via the protrusion 56 against the urging force due to the coil spring, and meshing of the reel gear 46 and the braking gear 52 is made to be released. Then, the electromagnet 81 provided on the upper surface 82A of the rotating shaft 82 at the outside of the driving gear 80 is attached (adhered) to the reel plate 41, thereby the rotation center of the driving gear 80 and the rotation center of the driving gear 40 are preferably secured (held) while the driving gear 80 is meshed with the reel gear 40.

In this way, in the case of the magnetic tape cartridge 10 in which the single reel 30 is accommodated, releasing of braking of the reel 30 by the braking member 50 as well as meshing of the driving gear 80 and the reel gear 40 can be carried out only by downward movement of the bucket in which the magnetic tape cartridge 10 is loaded (in other words, only by relative upward movement of the rotation shaft 82 on which the driving gear 80 is provided). Therefore, when this case of the magnetic tape cartridge 10 in which the single reel 30 is accommodated is compared to a case of a magnetic tape cartridge in which a pair of reels are accommodated, where a braking member is made to operate with a gear formed at a circumference of a lower flange of the reel, and releasing of the braking member and meshing of a driving gear and a reel gear are respectively carried out by separated operations, it is understood that the structure of the magnetic tape cartridge 10 in which the single reel 30 is accommodated is much simpler that that of the magnetic tape cartridge in which the pair of reels are accommodated.

Because the reel gear 40 is meshed with the driving gear 80 at only planes which are substantially orthogonal to the radial directions of the reel 30, like a spline manner engaging, the reel gear 40 is meshed with the driving gear 80 strongly and certainly. Accordingly, when the reel gear 40 is driven to rotate by the driving gear 80, a gap (clearance) and the like at the engaging portions between the reel gear 40 and the driving gear 80 is not generated. Therefore, "swelling" is not generated at the lower flange portion 34, a rotating power from the driving gear 80 is transmitted to the reel gear 40 efficiently, and feeding out and rewinding of the magnetic tape T can preferably performed. Further, because positioning in the height direction of the reel 30 with respect to the drive device is carried out by that the lower surface of the convex portion 42 provide at the lower surface of the reel 30 (the reel hub 32) abuts on a portion of the upper surface 82A of the rotating shaft 82, which is outside the electromagnet 81, the positioning is carried out with accuracy compared with the conventional device.

On the other hand, the pull out pin provided at the drive device engages with the concave portion 72 of the leader block 70 to which the tip end portion of the magnetic tape T is attached. The leader block 70 is pull out from the magnetic tape cartridge 10. Then, the leader block 70 is fitted to the reel hub of the take up reel of the drive device such that the magnetic tape T can be wound on the take up reel. At this time, while the reel 30 and the take up reel are driven to rotate synchronously and the magnetic tape T is successively taken up onto the take up reel, information is recorded or played back.

When the magnetic tape T is completely taken up onto the take up reel, the reel 30 and the take up reel is driven to rotate in a reverse direction, and the magnetic tape T is taken up onto the reel 30. Then, when the magnetic tape T is completely taken up onto the reel 30, the leader block 70 is pulled out from the reel hub of the take up reel and is engaged at the opening 60 so as to close the opening 60.

Then, the magnetic force of the electromagnet 81 is released, the rotating shaft 82 is made to move downwardly, meshing of the reel gear 40 and the driving gear 80 is made to release, and the protrusion 84 is pulled from the through hole 84A. Then, the braking member 50 is pushed downwardly by urging force of the coil spring 48, the reel gear 46 and the braking gear 52 are made to mesh each other, therefore, as described above, the reel 30 is prevented from rotating inadvertently. In this way, the magnetic tape cartridge 10 is taken out from the drive device.

As described above, in the present invention, because the reel gear for rotating reel is meshed with the driving gear of the drive device at only planes which are substantially orthogonal to the radial directions of the reel, the reel gear is meshed with the driving gear strongly and certainly. Accordingly, mashing between the reel gear and the driving gear is not displaced due to rotation. Therefore, "swelling" is not generated at the flange portion, and feeding out and rewinding of the recording tape can preferably performed. Further, because the reference portion for positioning in the height direction of the reel is provided at a portion other than the reel gear for rotating reel, the positioning can be carried out with accuracy.

What is claimed is:

1. A recording tape cartridge in combination with a drive device, the combination comprising:

a case in which a single reel is accommodated, the reel including a hub which has an upper flange portion and a lower flange portion at an upper end portion and a lower end portion thereof respectively and on which a recording tape is wound;

a gear for rotating the reel, which is provided at a central portion of a lower surface of the reel and meshed with a driving gear of the drive device at only planes substantially orthogonal to radial directions of the reel; and a reference portion, which is provided at the lower surface of the reel, for positioning the reel in an axial direction of the reel by abutting on a portion for positioning of the drive device, wherein the reference portion comprises a plurality of convex portions protruding from the lower surface of the reel.

2. The recording tape cartridge in combination with a drive device according to claim 1, wherein the plurality of convex portions are provided at the lower surface of the reel at the outside of the gear for rotating the reel.

3. The recording tape cartridge in combination with a drive device according to claim 1, wherein the portion for positioning, which abuts on the reference portion, is provided at a tip surface of a rotating shaft for rotating the driving gear.

4. The recording tape cartridge in combination with a drive device according to claim 3, wherein a metal plate is provided at the lower surface of the reel at the outside of the gear for rotating the reel, and an electromagnet is provided at the tip surface of the rotating shaft at a position corresponding to the metal plate.

5. The recording tape cartridge in combination with a drive device according to claim 1, wherein the reference portion has a ring shaped configuration having a predetermined height.

6. The recording tape cartridge in combination with a drive device according to claim 5, wherein the portion for positioning, which abuts on the reference portion, is provided at a tip surface of a rotating shaft for rotating the driving gear.

7. The recording tape cartridge in combination with a drive device according to claim 6, wherein a plate made of metal is provided at the lower surface of the reel at the outside of the gear for rotating the reel, and an electromagnet is provided at the tip surface of the rotating shaft at a position corresponding to the plate made of metal.

8. The recording tape cartridge in combination with a drive device according to claim 1, wherein the gear for rotating the reel is meshed with the driving gear of the drive device at only planes orthogonal to radial directions of the reel.

9. A recording tape cartridge in combination with a drive device, the combination comprising:

a case in which a single reel is accommodated, the reel including a hub which has an upper flange portion and a lower flange portion at an upper end portion and a lower end portion thereof respectively and on which a recording tape is wound;

a gear for rotating the reel, which is provided at a central portion of a lower surface of the reel and meshed with a driving gear of the drive device at only planes substantially orthogonal to radial directions of the reel; and a reference portion, which is provided at the lower surface of the reel, for positioning the reel in an axial direction of the reel by abutting on a portion for positioning of the drive device, wherein the reference portion has a ring shaped configuration having a predetermined height, wherein the reference portion is provided at the lower surface of the reel at the outside of the gear for rotating the reel.

10. A recording tape cartridge in combination with a drive device, the combination comprising:

a case in which a single reel is accommodated, the reel including a hub which has an upper flange portion and a lower flange portion at an upper end portion and a lower end portion thereof respectively and on which a recording tape is wound;

a gear for rotating the reel, which is provided at a central portion of a lower surface of the reel and meshed with a driving gear of the drive device at only planes substantially orthogonal to radial directions of the reel; and a reference portion, which is provided at the lower surface of the reel, for positioning the reel in an axial direction of the reel by abutting on a portion for positioning of the drive device, wherein the gear for rotating the reel has a plurality of bar shaped protrusion portions, and an inner side width, in a circumferential direction of the gear for rotating the reel, of each bar shaped protrusion portion is narrower than an outer side width thereof in a circumferential direction of the gear for rotating the reel.

11. A recording tape cartridge in combination with a drive device, the combination comprising:

a case in which a single reel is accommodated, the reel including a hub which has an upper flange portion and a lower flange portion at an upper end portion and a lower end portion thereof respectively and on which a recording tape is wound;

a gear for rotating the reel, which is provided at a central portion of a lower surface of the reel and meshed with a driving gear of the drive device at only planes substantially orthogonal to radial directions of the reel; and a reference portion, which is provided at the lower surface of the reel, for positioning the reel in an axial direction of the reel by abutting on a portion for positioning of the drive device, wherein the gear for rotating the reel has a plurality of bar shaped protrusion portions, and a tip end of each bar shaped protrusion portion has a substantially sawtooth configuration in cross sectional view.

12. A recording tape cartridge comprising:

a case in which a single reel is accommodated, the reel including a hub which has an upper flange portion and a lower flange portion at an upper end portion and a lower end portion thereof respectively and on which a recording tape is wound;

a gear for rotating the reel, which is provided at a central portion of a lower surface of the reel and is adapted to mesh with a driving gear of a drive device at only planes substantially orthogonal to radial directions of the reel; and a reference portion, which is provided at the lower surface of the reel, adapted to position the reel in an axial direction of the reel by abutting on a portion for positioning of the drive device, wherein the reference portion comprises a plurality of convex portions protruding from the lower surface of the reel.

13. The recording tape cartridge of claim 12, wherein the plurality of convex portions are provided at the lower surface of the reel at the outside of the gear for rotating the reel.

14. The recording tape cartridge of claim 12, wherein the reference portion has a ring shaped configuration having a predetermined height.

15. The recording tape cartridge of claim 12, wherein the reference portion is provided at the lower surface of the reel at the outside of the gear for rotating the reel.

16. The recording tape cartridge of claim 12, wherein the gear for rotating the reel has a plurality of bar shaped protrusion portions, and an inner side width, in a circumferential direction of the gear for rotating the reel, of each bar shaped protrusion portion is narrower than an outer side width thereof in a circumferential direction of the gear for rotating the reel.

17. The recording tape cartridge of claim 12, wherein the gear for rotating the reel has a plurality of bar shaped protrusion portions, and a tip end of each bar shaped protrusion portion has a substantially sawtooth configuration in cross sectional view.

* * * * *